United States Patent
Lee et al.

(10) Patent No.: US 11,658,819 B2
(45) Date of Patent: May 23, 2023

(54) METHOD FOR GENERATING PUBLIC KEY AND SECRET KEY BASED ON MODULE-WAVY AND MODULE-LWR AND METHOD OF ENCRYPTION AND DECRYPTION USING THE KEYS

(71) Applicants: Seoul National University R&DB Foundation, Seoul (KR); UNIST (Ulsan National Institute of Science and Technology), Ulsan (KR)

(72) Inventors: Joohee Lee, Seoul (KR); Junghee Cheon, Seoul (KR); Duhyeong Kim, Seoul (KR); Aaram Yun, Ulsan (KR)

(73) Assignees: ULSAN NATIONAL INSTITUTE OF SCIENCE AND TECHNOLOGY, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/904,806

(22) Filed: Jun. 18, 2020

(65) Prior Publication Data
US 2020/0322147 A1 Oct. 8, 2020

Related U.S. Application Data

(63) Continuation of application No. PCT/KR2018/016014, filed on Dec. 17, 2018.

(30) Foreign Application Priority Data

Dec. 29, 2017 (KR) .......................... 10-2017-0183661

(51) Int. Cl.
*H04L 9/30* (2006.01)
*H04L 9/08* (2006.01)

(52) U.S. Cl.
CPC .......... *H04L 9/3006* (2013.01); *H04L 9/0861* (2013.01); *H04L 9/0894* (2013.01)

(58) Field of Classification Search
CPC .... H04L 9/3006; H04L 9/0861; H04L 9/0894
(Continued)

(56) References Cited

U.S. PATENT DOCUMENTS

| | | | |
|---|---|---|---|
| 8,861,716 | B2 | 10/2014 | Halevi et al. |
| 9,252,954 | B2 | 2/2016 | Halevi et al. |
| 2011/0243320 | A1 | 10/2011 | Halevi et al. |
| 2015/0033033 | A1 | 1/2015 | Halevi et al. |

FOREIGN PATENT DOCUMENTS

| | | |
|---|---|---|
| WO | 2011123418 A1 | 10/2011 |
| WO | 2019132354 A1 | 7/2019 |

OTHER PUBLICATIONS

Costache, Anamaria, and Nigel P. Smart. "Homomorphic Encryption without Gaussian Noise." IACR Cryptol. ePrint Arch. 2017 (2017): 163. (Year: 2017).*

(Continued)

*Primary Examiner* — Kambiz Zand
*Assistant Examiner* — Phuc Pham
(74) *Attorney, Agent, or Firm* — Winthrop & Weinstine, P.A.

(57) ABSTRACT

The computer-implemented method for generating a public key and a secret key of the present disclosure comprises determining, by a processor, the secret key (s) by sampling from a distribution over $\{-1, 0, 1\}^{nd}$; determining, by a processor, a first error vector (e) by sampling from $(D_{\alpha q}{}^n)^d$ and a second error value (e') by sampling from $D_{\alpha q}{}^n$; choosing, by a processor, a randomly uniform matrix A which satisfies A·s=e (mod q); choosing, by a processor, a random column vector b which satisfies (Continued)

$$\langle b, s \rangle = \left\lfloor \frac{q}{2} \right\rfloor + e' \pmod{q};$$

and determining, by a processor, the public key (pk) by $(A \| b) \in R_q^{d \times (d+1)}$.

1 Claim, 2 Drawing Sheets

(58) Field of Classification Search
USPC .......................................................... 380/30
See application file for complete search history.

(56) References Cited

OTHER PUBLICATIONS

Chase, Melissa, et al. "Security of homomorphic encryption." HomomorphicEncryption. org, Redmond WA, Tech. Rep (2017). (Year: 2017).*

International Search Report for corresponding Int'l Patent Application PCT/KR2018/016014, dated Mar. 8, 2019.
International Written Opinion for corresponding Int'l Patent Application PCT/KR2018/016014, dated Mar. 8, 2019.
Alperin-Sheriff et al., "Dimension-Preserving Reductions from LWE to LWR," Cryptology ePrint Archive: Report 2016/589, Version: 20160606:150451; 21 pgs (Jun. 6, 2016).
Bishop et al., "New Circular Security Counterexamples from Decision Linear and Learning with Errors," Cryptology ePrint Archive: Report 2015/715, Version: 20151201:020914; 27 pgs (Dec. 1, 2015).
Bos et al., "CRYSTAL—Kyber: a CCA-secure module-lattice-based KEM," 2018 IEEE European Symposium on Security and Privacy (EuroS&P); 14 pgs; (Apr. 2018).
Chase et al., "Security of Homomorphic Encryption," Homomorphic Encryption Standardization Workshop; 27 pgs (Jul. 13-14, 2017).
Cheon et al., "A Practical Post-Quantum Public-Key Cryptosystem Based on spLWE," Cryptology ePrint Archive: Report 2016/1055, Version: 20161121:021856; 19 pgs (Nov. 21, 2016).
Costache et al., "Homomorphic Encryption without Gaussian Noise," Cryptology ePrint Archive: Report 2017/163, Version: 20170223:140236; 24 pgs (Feb. 23, 2017).

* cited by examiner

METHOD FOR GENERATING PUBLIC KEY AND SECRET KEY BASED ON MODULE-WAVY AND MODULE-LWR AND METHOD OF ENCRYPTION AND DECRYPTION USING THE KEYS

CROSS-REFERENCE TO RELATED APPLICATION

This application is a continuation of International Application No. PCT/KR2018/016014, filed on Dec. 17, 2018, which claims priority to Korean Application No. 10-2017-0183661, filed on Dec. 29, 2017. Both applications are incorporated herein by reference in their entirety.

TECHNICAL FILED

The present disclosure relates to a lattice-based public key cryptographic method. More specifically, the present disclosure relates to a method for generating a public key and a secret key based on Module-Wavy and Module-LWR, an encryption/decryption method using the keys.

BACKGROUND

Encryption methods are generally divided into a symmetric key encryption and an asymmetric key encryption. In the symmetric key encryption, the same key is used for encryption and decryption, thereby providing fast encryption and decryption. However, the security can be severely attacked when the key is stolen by a third party. In order to solve the problem, an asymmetric key encryption has been introduced. The asymmetric key cryptographic method uses a public key which is disclosed and a secret key (private key) which is provided only to a user. A plain text is encrypted by a public key and the encrypted message is decrypted by a secret key. Among the public key encryption schemes, RSA algorithm has been widely used. However, it is expected that RSA encryption can be broken by a quantum computer. Thus, more powerful encryption scheme is needed.

Recently, lattice-based public key cryptography called "Kyber" has been introduced. The Kyber scheme is shown in "Bos, J., Ducas, L., Kiltz, E., Lepoint, T., Lyubashevsky, V., Schanck, J. M., Schwabe, P., Stehl'e, D.: CRYSTALS—kyber: a CCA-secure module lattice-based KEM. Cryptology ePrint Archive, Report 2017/634 (2017)" and website of http://eprint.iacr.org/2017/634. However, the size of the encrypted message is large since the encrypted message consists of two components and the speed is low compared to the conventional scheme such as "NTRU."

SUMMARY

The object of the present disclosure is to provide a lattice-based public key cryptographic method wherein the size of an encrypted message, communication load and communication traffic are reduced compared with the conventional arts.

The computer-implemented method for generating a public key and a secret key of the present disclosure comprises determining, by a processor, the secret key (s) which is a vector of polynomials of degree (n−1), the coefficients of which are −1, 0, or +; determining, by a processor, a first error vector (e) by sampling from $(D_{\alpha q}^n)^d$ and a second error value (e') by sampling from $D_{\alpha q}^n$; choosing, by a processor, a randomly uniform matrix $A \in R_q^{d \times d}$ which satisfies A·s=e (mod q); choosing, by a processor, a random column vector $b \in R_q^d$ which satisfies $$\langle b, s \rangle = \left\lfloor \frac{q}{2} \right\rfloor + e' \pmod{q};$$

and determining, by a processor, the public key (pk) by $(A\|b) \in R_q^{d \times (d+1)}$.

The secret key (s) can be sampled from $\mathcal{H} WT_n(h_s)^d$.

The computer-implemented method of encrypting a message using the public key of the present disclosure comprises receiving, by a processor, the public key (pk) and a message ($m \in R_2$); randomly selecting, by a processor, d polynomials of degree (n−1), the coefficients of which are −1, 0, or +1; generating, by a processor, a first value by operating the polynomials and at least a portion of the public key (pk); generating, by a processor, a second value by encoding the message with at least a portion of the public key (pk); generating, by a processor, a third value by operating the first value and the second value; and generating a ciphertext by rounding operation to the third value for removing pre-set lower bits.

In an embodiment of the present disclosure, a column vector (r) of the polynomials is determined by sampling over $\mathcal{H} WT_n(h_r)^d$; the first value is determined by $A^T \cdot r$; the second value is determined by m·b; the third value is determined by $A^T \cdot r + m \cdot b$; and then the ciphertext (c) is generated by $$c = \left\lfloor \frac{p}{q} \cdot (A^T \cdot r + m \cdot b) \right\rceil \in R_p^d.$$

The computer-implemented method of decrypting the ciphertext of the present disclosure comprises receiving, by a processor, a ciphertext c; and decrypting, by a processor, the ciphertext c to obtain the message (m). The message (m) is obtained by the decryption process of $$m = \left\lfloor \frac{2}{p} \cdot \langle c, s \rangle \right\rceil.$$

BRIEF DESCRIPTION OF DRAWINGS

The present disclosure will be more fully understood from the following detailed description taken in conjunction with the accompanying drawings.

Figure 1:
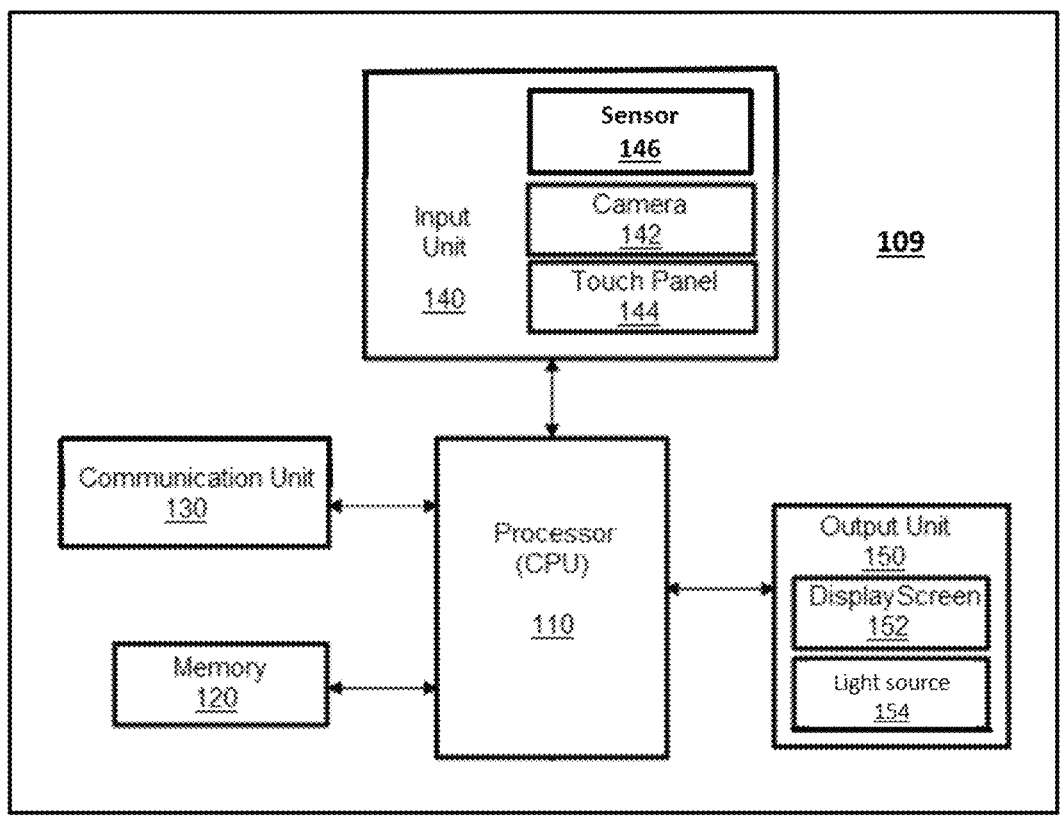
FIG. 1 is one embodiment of an example diagrammatic view of a device architecture which carries out the present disclosure.
Figure 2:
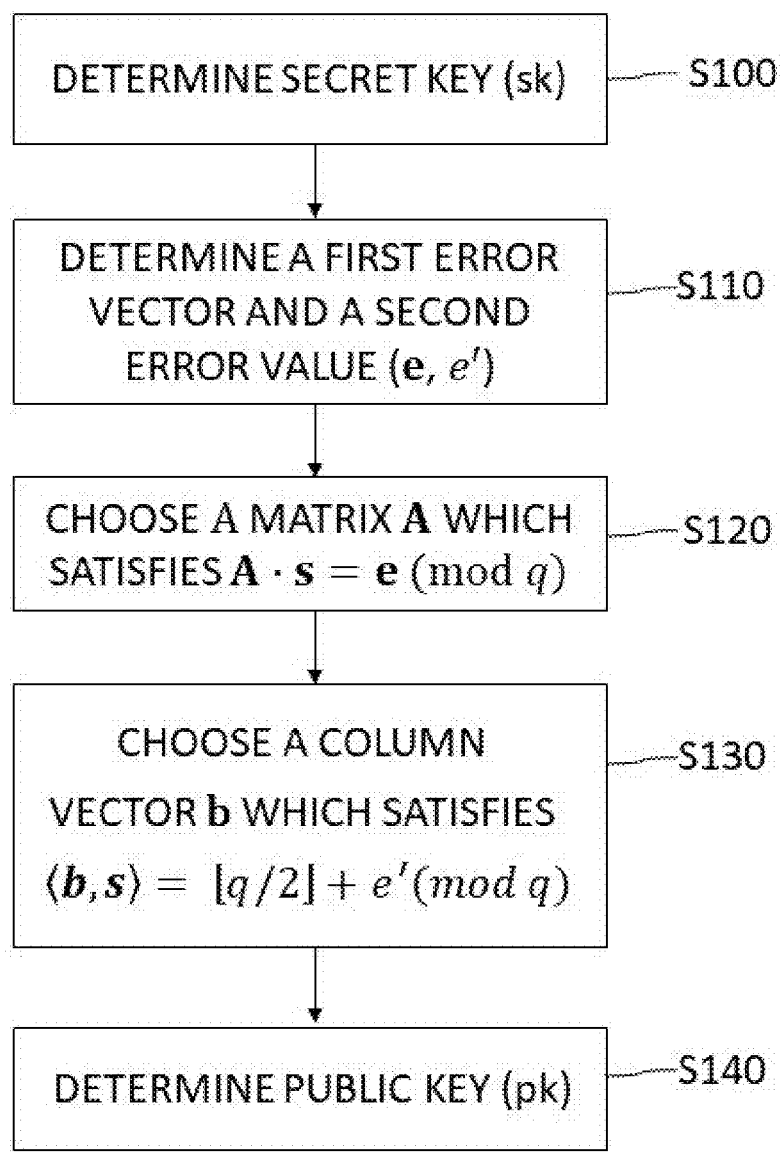
FIG. 2 is a flow chart of the process which generates a public key and a secret key according to the present disclosure.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The method according to the present disclosure can be carried out by an electronic arithmetic device such as a computer, tablet, mobile phone, portable computing device, stationary computing device, etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A variety of devices can be used herein. FIG. 1 illustrates an example diagrammatic view of an exemplary device architecture according to embodiments of the present disclosure. As shown in FIG. 1, a device 109 may contain multiple components, including, but not limited to, a processor (e.g., central processing unit (CPU) 110, a memory 120, a wired or wireless communication unit 130, one or more input units 140, and one or more output units 150. It should be noted that the architecture depicted in FIG. 1 is simplified and provided merely for demonstration purposes. The architecture of the device 109 can be modified in any suitable manner as would be understood by a person having ordinary skill in the art, in accordance with the present claims. Moreover, the components of the device 109 themselves may be modified in any suitable manner as would be understood by a person having ordinary skill in the art, in accordance with the present claims. Therefore, the device architecture depicted in FIG. 1 should be treated as exemplary only and should not be treated as limiting the scope of the present disclosure.

The processor 110 is capable of controlling operation of the device 109. More specifically, the processor 110 may be operable to control and interact with multiple components installed in the device 109, as shown in FIG. 1. For instance, the memory 120 can store program instructions that are executable by the processor 110 and data. The process described herein may be stored in the form of program instructions in the memory 120 for execution by the processor 110. The communication unit 130 can allow the device 109 to transmit data to and receive data from one or more external devices via a communication network. The input unit 140 can enable the device 109 to receive input of various types, such as audio/visual input, user input, data input, and the like. To this end, the input unit 140 may be composed of multiple input devices for accepting input of various types, including, for instance, one or more cameras 142 (i.e., an "image acquisition unit"), touch panel 144, microphone (not shown), sensors 146, keyboards, mice, one or more buttons or switches (not shown), and so forth. The term "image acquisition unit," as used herein, may refer to the camera 142, but is not limited thereto. The input devices included in the input 140 may be manipulated by a user. The output unit 150 can display information on the display screen 152 for a user to view. The display screen 152 can also be configured to accept one or more inputs, such as a user tapping or pressing the screen 152, through a variety of mechanisms known in the art. The output unit 150 may further include a light source 154. The device 109 is illustrated as a single component, but the device may also be composed of multiple, separate components that are connected together and interact with each other during use.

The device 109 can thus be programmed in a manner allowing it to carry out the steps and/or processes of the present disclosure.

Generally, bold lowercase letter(s) means a column vector and bold uppercase letters(s) means a matrix in this specification.

Notations n: a power of 2
d: a positive integer
q: a positive integer; a large modulus
p: a positive integer less than q; a rounding modulus $$\mathbb{Z}_q = \left(-\frac{q}{2}, \frac{q}{2}\right] \cap \mathbb{Z}$$

which means set of integers, where $$-\frac{q}{2} < \text{the integer} \leq \frac{q}{2}; \mathbb{Z}_t$$

is defined by the same way.

$$R = \frac{\mathbb{Z}[x]}{(f(x))}$$

$$R_q = \frac{\mathbb{Z}_q[x]}{(f(x))}$$

$$R_t = \frac{\mathbb{Z}_t[x]}{(f(x))}$$

(f(x)): ideal of $\mathbb{Z}_q[x]$ which is generated by f(x)

f(x): polynomial of degree n (for example, a cyclotomic polynomial when n=Φ(N))

R (ring): set of polynomials of degree (n−1), the coefficients of which are integers Operation over R: calculation of remainder after dividing the results of operation for every polynomial by f(x)

$R_q$ (ring): set of polynomials of degree (n−1), the coefficients of which are elements of $\mathbb{Z}_q$ Operation over $R_q$: every polynomial is operated; the results of the operation is divided by f(x); and then q is added to or is subtracted from each coefficient such that all coefficients are included in $\mathbb{Z}_q$ $R_t$ (ring): set of polynomials of degree (n−1), the coefficients of which is elements of $\mathbb{Z}_t$ Operation over $R_t$: every polynomial is calculated; the results of the calculation is divided by f(x); and then t is added to or is subtracted from each coefficient such that all coefficients are included in $\mathbb{Z}_t$ ⌈r⌉: the nearest integer to real number r, rounding upwards in case of a tie For two matrices A and B having the same number of rows, (A∥B) denotes their concatenation, i.e., for $A \in \mathbb{Z}^{m \times n_1}$ and $B \in \mathbb{Z}^{m \times n_2}$, the m×($n_1$+$n_2$) matrix C=(A∥B) is defined as $$c_{i,j} = \begin{cases} a_{i,j} & 1 \leq j \leq n_1 \\ b_{i,(j-n_1)} & n_1 < j \leq n_1 + n_2 \end{cases}$$

x←D: sampling x according to the distribution D. It denotes the uniform sampling when D is a finite set.

$D_\sigma$: a discrete Gaussian distribution; a probability distribution with support $\mathbb{Z}$ that assigns a probability proportional to $$\exp\left(-\frac{\pi x^2}{\sigma^2}\right)$$

to each $x \in \mathbb{Z}$. The variance of $D_\sigma$ is very close to $\sigma^2/2\pi$ unless σ is very small.

For an integer 0≤h≤n, the distribution $\mathcal{H} WT_n(h)$ samples a vector from {−1, 0, 1}$^n$, under the condition that it has h nonzero elements. This sampled vector a=($a_0$, $a_1$, . . . , $a_{n-1}$) is identified to a polynomial $a(x) = \sum_{i=0}^{n-1} a_i \cdot x^i$ of degree (n−1).

For an integer n≥1, $D^n$ denotes the product of independent and identically distributed random variables which are according to Distribution D.

Module-LWR problems are disclosed in Alperin-Sheriff, Jacob, and Daniel Apon. "Dimension-Preserving Reductions from LWE to LWR." (IACR Cryptology ePrint Archive report 2016/589. (2016). http://eprint.iacr.org/2016/589).

For positive integers n, d, q, p (p<q), let $s \in R^d$ be a secret polynomial vector. $A_{n,d,q,p}^{MLWR}(s)$ is the distribution of $$\left(a, \left\lceil \frac{p}{q} \langle a, s \rangle_q \right\rfloor\right) \in R_q^d \times R_p,$$

where $a \leftarrow R_q^d$. The Module-LWR problem $MLWR_{n,q,q,p}(D)$ is to distinguish between $A_{n,d,q,p}^{MLWR}(s)$ and the uniform distribution over $R_q^d \times R_p$ where s←D.

For a secret polynomial $s \in R^d$, we first choose an error polynomial $e \leftarrow D_{\alpha q}^n$, and uniform randomly choose $a \leftarrow R_q^d$ satisfying $\langle a, s \rangle_q = e$ in $R_q$. Denote the distribution a by $A_{n,d,q,\alpha}^{MWavy}(s)$. The Module-Wavy problem $MWavy_{n,d,q,\alpha}(D)$ is to distinguish $A_{n,d,q,\alpha}^{MWavy}(s)$ and the uniform distribution over $R_q^d$ where s←D.

The method for generating the public key and the secret key according to the present disclosure will be described hereinafter.

A security parameter is determined and then the positive integers n, $h_s$, $h_r$, p, q are chosen based on the determined security parameter, where $h_s$ and $h_r$ are less than n. Further, fix an error parameter α with 0<α<1. The security parameter λ is a measure of the security of an encryption scheme. For example, the security parameter λ is set to "128."

In the step S100, a polynomial column vector s is sampled by $s \leftarrow \mathcal{H} WT_n(h_s)^d$. The polynomial of the column vectors has coefficients of "0," "+1," or "−1." The polynomial can be determined as a secret key as described in the below.

In the step S110, the first error vector (e) and a second error value (e') are sampled as follows:

$$e \leftarrow (D_{\alpha q}^n)^d$$

$$e' \leftarrow D_{\alpha q}^n$$

In the step S120, the matrix $A \in R_q^{d \times d}$ satisfying A·s=e (mod q) uniformly at random is chosen.

In the step S130, the random column vector $b \in R_q^d$ satisfying $$\langle b, s \rangle = \left\lfloor \frac{q}{2} \right\rfloor + e' \pmod{q}$$

is chosen.

$$\left\lfloor \frac{q}{2} \right\rfloor$$

means the round down of $$\frac{q}{2}.$$

In the step S140, the public key and the secret key of the present disclosure can be determined as follows:

Public key$(pk)=(A\|b) \in R_q^{d \times (d+1)}$

Secret key$(sk)=s$

The encryption and decryption methods of the present disclosure will be described in the below.

A message $m \in R_2$ is received by a user having a public key. The message m can be represented by polynomial of degree n, the coefficients of which are elements of $\mathbb{Z}_2$.

A polynomial column vector r, the coefficient of which is 0, −1, or +1 is sampled as follows:

$$r \leftarrow \mathcal{H} \, WT_n(h_r)^d$$

$\mathcal{H} \, WT_n(h_s)^d$ and $\mathcal{H} \, WT_n(h_r)^d$ means to randomly sample d polynomials of degree (n−1), the coefficient of which is −1, 0, or +1, from $\mathcal{H} \, WT_n(h_s)$ and $\mathcal{H} \, WT_n(h_r)$, respectively.

A first value is generated by operating the aforementioned polynomials and at least a portion of the public key; a second value is generated by encoding the message with at least a portion of the public key; and then a third value is generated by operating the first value and the second value.

The first value can be generated by the operation of $A^T \cdot r$. The second value can be generated by the operation of $m \cdot b$. The third value can be generated by the operation of $A^T \cdot r + m \cdot b$. The ciphertext is generated by rounding operation to the third value so as to remove pre-set lower bits.

The ciphertext c can be generated as follows:

$$c = \left\lfloor \frac{p}{q} \cdot (A^T \cdot r + m \cdot b) \right\rceil \in R_p^d$$

$R_p^d$ means a ring, the elements of which are tuples of d polynomials of degree (n−1). The coefficients of the polynomial are the elements of $\mathbb{Z}_p$.

The size of the ciphertext c of the present disclosure is significantly reduced since the ciphertext has one component unlike the conventional Kyber scheme and p<q. Thus, the encryption process is faster and communication traffic is significantly reduced compared to the conventional lattice-based public key cryptography.

The ciphertext c can be decrypted as follows such that the message is obtained.

$$m = \left\lfloor \frac{2}{p} \cdot \langle c \cdot s \rangle \right\rceil$$

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A computer-implemented method of decrypting a ciphertext, the method comprising:

receiving, by a processor, a ciphertext c, over a network; and decrypting, by a processor, the ciphertext c to obtain a message (m) which is $$\left\lfloor \frac{2}{p} \cdot \langle c, s \rangle \right\rceil,$$

s being a secret key;

wherein a public key and the secret key are generated by a method comprising:

a step of determining, by a processor, the secret key (s) by sampling from $\mathcal{H} \, WT_n(h_s)^d$;

a step of determining, by a processor, an error vector (e) by sampling from $(D_{\alpha q}^n)^d$ and an error value (e') by sampling from $D_{\alpha q}^n$;

a step of choosing, by a processor, a randomly uniform matrix $A \in R_q^{d \times d}$ which satisfies $A \cdot s = e \pmod{q}$;

a step of choosing, by a processor, a random column vector $b \in R_q^d$ which satisfies $$\langle b, s \rangle = \left\lfloor \frac{q}{2} \right\rfloor + e' \pmod{q};$$

and a step of determining, by a processor, $(A\|b) \in R_q^{d \times (d+1)}$ as the public key (pk);

wherein the ciphertext c is generated by a method comprising a step of receiving, by a processor, the public key (pk) and a message ($m \in R_2$); and a step of generating, by a processor, the ciphertext by $$c = \left\lfloor \frac{p}{q} \cdot (A^T \cdot r + m \cdot b) \right\rceil \in R_p^d;$$

wherein a column vector (r) is determined by sampling from $\mathcal{H} \, WT_n(h_s)^d$; and wherein:

$\alpha$ is an error parameter which satisfies $0 < \alpha < 1$;

q is a positive integer;

p is a positive integer less than q;

d is a positive integer;

n is a power of 2;

$h_s$ is a positive integer less than n;

$h_r$ is a positive integer less than n;

$D_{\alpha q}$ is a discrete Gaussian distribution;

$D_{\alpha q}^n$ is a product distribution of independent and identically distributed n random variables according to the distribution $D_{\alpha q}$;

$(D_{\alpha q}^n)^d$ is a product distribution of independent and identically distributed d random variables according to the distribution $D_{\alpha q}^n$; and $\mathcal{H}\mathrm{WT}_n(h_s)^d$ and $\mathcal{H}\mathrm{WT}_n(h_r)^d$ are distributions of randomly sampled d polynomials of degree (n−1), the coefficients of which are −1, 0, or +1, from $\mathcal{H}\mathrm{WT}_n(h_s)$ and $\mathcal{H}\mathrm{WT}_n(h_r)$, respectively, wherein $\mathcal{H}\mathrm{WT}_n(h_s)$ and $\mathcal{H}\mathrm{WT}_n(h_r)$ are distributions of uniformly sampled vectors from $\{-1, 0, 1\}^n$, under the condition that said vectors have $h_s$ and $h_r$ non-zero elements, respectively.

* * * * *